United States Patent [19]

Hayama et al.

[11] Patent Number: 4,839,457
[45] Date of Patent: Jun. 13, 1989

[54] DEVELOPING COMPOSITION AND A SHEET FOR PRESSURE-SENSITIVE COPY PAPER

[75] Inventors: Kazuhide Hayama; Yukio Saitoh, both of Yokkaichi, Japan

[73] Assignee: Mitsubishi Petrochemical Co., Ltd., Tokyo, Japan

[21] Appl. No.: 170,344

[22] Filed: Mar. 18, 1988

[30] Foreign Application Priority Data

Mar. 20, 1987 [JP] Japan .................................. 62-63998
Jul. 17, 1987 [JP] Japan .................................. 62-178592

[51] Int. Cl.$^4$ ....................... C08G 8/04; C08G 14/04
[52] U.S. Cl. ...................................... 528/86; 528/129; 528/139; 528/144; 528/153; 528/155; 528/230; 528/236
[58] Field of Search ................. 528/86, 129, 139, 144, 528/153, 155, 230, 236; 428/530; 503/210, 225

[56] References Cited

U.S. PATENT DOCUMENTS

| | | | |
|---|---|---|---|
| 3,672,935 | 6/1972 | Miller et al. | 117/36.8 |
| 3,732,120 | 5/1973 | Brockett et al. | 117/16 |
| 4,173,684 | 11/1979 | Stolfo | 428/531 |
| 4,216,299 | 8/1980 | Kikuga et al. | 525/491 |
| 4,216,300 | 8/1980 | Kikuga et al. | 525/491 |
| 4,409,374 | 10/1983 | Kikuga et al. | 525/491 |
| 4,412,045 | 10/1983 | Kikuga et al. | 525/501 |
| 4,620,874 | 11/1986 | Booth, Jr. et al. | 106/21 |

Primary Examiner—Maurice J. Welsh
Assistant Examiner—S. A. Acquah
Attorney, Agent, or Firm—Oblon, Fisher, Spivak, McClelland & Maier

[57] ABSTRACT

A developing composition and a sheet for a pressure-sensitive copy paper comprising a phenolic resin as a main component which is obtained by condensating with formaldehyde using a p-substituted phenol with a 2,4-di-substituted and/or 2,6-di-substituted phenol, and zinc oxide which may be added thereto, as occasion demands.

7 Claims, 1 Drawing Sheet

DEVELOPING COMPOSITION AND A SHEET FOR PRESSURE-SENSITIVE COPY PAPER

BACKGROUND OF THE INVENTION

The present invention relates to a developing composition and a sheet coated therewith for a pressure-sensitive copy paper, and particularly to a developing composition and a sheet for a pressure-sensitive copy paper in which a reduced degree of yellowing of a developed layer is generated and which exhibits excellent performance in regard to the coloring of colored images and improved weather resistance thereof.

A no-carbon pressure-sensitive copy paper comprises an upper sheet to which are applied micro-capsules each containing a solution of an electron donative colorless dye and a lower sheet to which is applied an electron acceptive developer. When the micro-capsules on the upper sheet are broken by pressure, the colorless dye which flows out reacts with the developer on the lower sheet to obtain a colored image. Examples of developers which have been put into practical use include active clay such as acid clay, p-substituted phenolic novolak resins such as p-phenylphenol novolak resins, and metal salts of aromatic carboxylic acids.

Of these developers, p-substituted phenolic novolak resins, particularly p-phenylphenol novolak resins, have advantages with respect to their excellent performance in terms of coloring and water resistance and the fastness properties of the colored images produced, and are thus frequently used. Such developers have certain disadvantages, however, in that developed layers to tend to yellow during storage in certain atmospheres, and various proposals have previously been put forward with a view to solving this disadvantage.

Examples of such proposals include Japanese Patent Publication No. 29364/1975 in which a resin formed by co-condensation with formaldehyde of p-phenylphenol and phenol substituted by alkyl groups at at least one of the 3-, 4-, and 5-positions is used as a developer composition for a pressure-sensitive copy paper and Japanese Patent Publication No. 4358/1986 in which a resin formed by co-condensation with formaldehyde or p-substituted phenol and phenol having three or more functional groups by any one of various methods is used as a developer composition for a pressure-sensitive copy paper. The use of these developer compositions has ameliorated the problems of yellowing to some extent, but not with completely satisfactory results.

In addition, it is stated in Japanese Patent Publication No. 31678/1985 that a composition formed by uniformly dissolving 1 to 20 parts by weight of a hindered phenol compound in 100 parts by weight of a phenol-formaldehyde polymer may be used as a developer for a pressure-sensitive copy paper. It is also stated in the same publication that the hindered phenol compound may be added at the same time as the addition of raw reaction materials in the reaction for producing the phenol-formaldehyde polymer. However, the condensation reaction between the hindered phenol compound added at the same time as the reaction raw materials and formaldehyde is not described in that same publication, and each of the examples described in the publication in which the hindered phenol compound and the reaction raw materials are added at one time uses a hindered phenol compound which produces substantially no condensation reaction with formaldehyde. In addition, the same publication states that the amount of the hindered phenol compound to be added is as small as 1 to 20 parts by weight relative to 100 parts by weight of a phenolic resin. The use of the developer composition disclosed in the publication still fails to adequately ameliorate the degree of yellowing combining the above-described factors.

SUMMARY OF THE INVENTION

It is an object of the present invention to provide a developer composition for a pressure-sensitive copy paper in which a reduced degree of yellowing of a developed layer is generated and which exhibits an excellent performance in terms of coloring.

The present invention provides a composition for use as a developer which comprises a phenolic resin obtained by condensation with formaldehyde using a given p-substituted phenol with 2,4-disubstituted phenol and/or 2,6-disubstituted phenol in a particular ratio, and, as occasion demands, zinc oxide.

In other words, the developer composition for a pressure-sensitive copy paper of the present invention is a composition which comprises as a main component a phenolic resin obtained by condensation with formaldehyde using 100 parts by weight of p-substituted phenol expressed by the following formula (I):

(wherein $R^1$ denotes an alkyl group having 1 to 12 carbon atoms, an aryl group having 6 to 12 carbon atoms, or an aralkyl group having 7 to 12 carbon atoms) with 22 to 150 parts by weight of 2,4-disubstituted phenol expressed by the following formula (II):

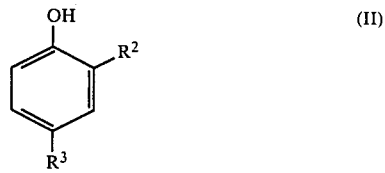

(wherein $R^2$ and $R^3$ each denote an alkyl group having 1 to 12 carbon atoms, an aryl group having 6 to 12 carbon atoms, or an aralkyl group having 7 to 12 carbon atoms, and which may be the same or different from each other) and/or 2,6-disubstituted phenol expressed by the following formula (III):

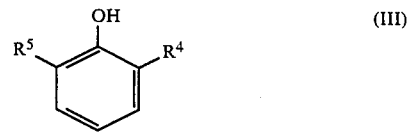

(wherein $R^4$ and $R^5$ each denote an alkyl group having 1 to 12 carbon atoms, and aryl group having 6 to 12 carbon atoms, or an aralkyl group having 7 to 12 carbon atoms, and which may be the same or different from each other).

The present invention also provides a developer composition comprising the above-described phenolic resin and, as occasion demand, zinc oxide added thereto.

BRIEF DESCRIPTION OF THE DRAWINGS

The accompanying

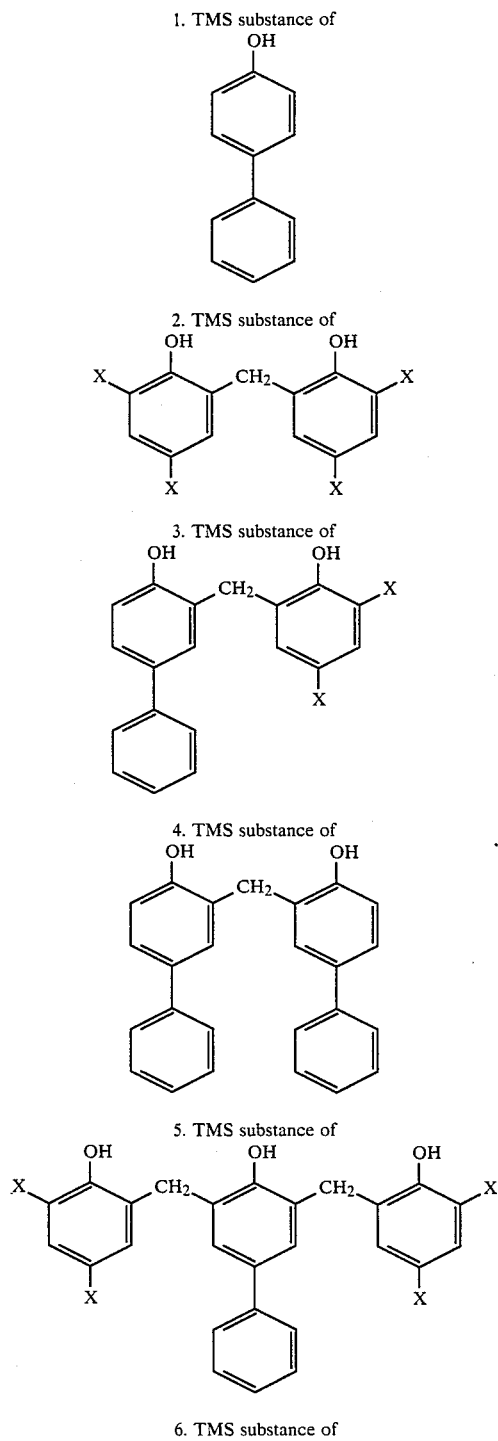

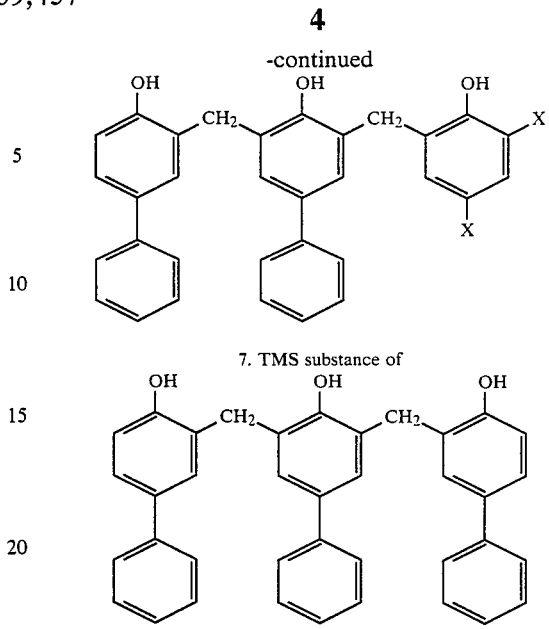

DETAILED DESCRIPTION OF THE INVENTION

Figure 1:
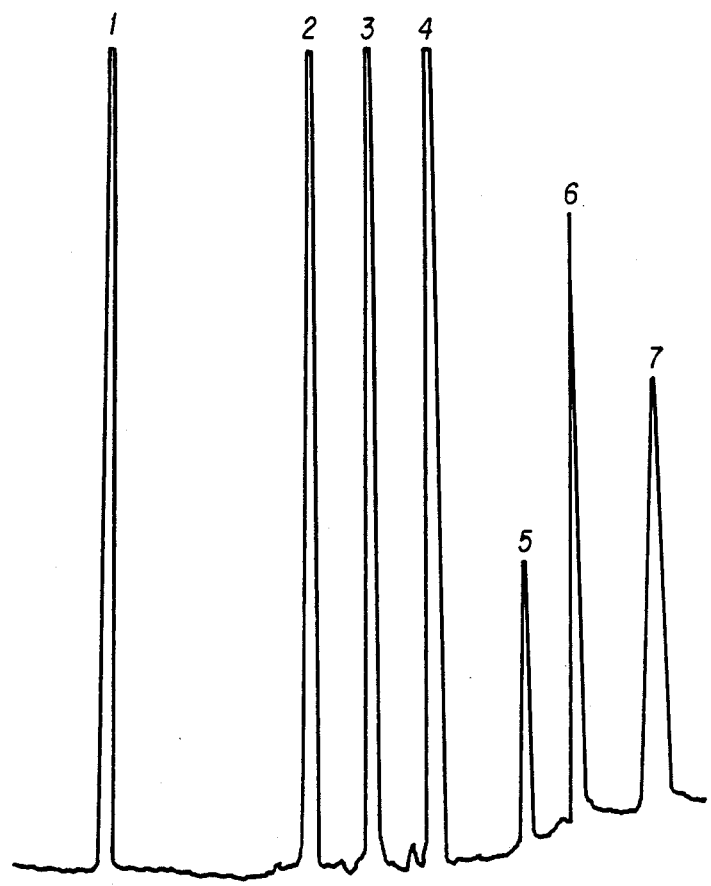
FIG. 1 shows the result obtained from measurement by gas chromatography of the trimethylsilylated substance of the phenolic resin obtained in Example 1. Peaks 1 to 7 correspond wiht the respective polymers described below (wherein X denotes a tert-butyl group and TMS substance denotes a trimethylsilylated substance).

Examples of p-substituted phenols expressed by Formula (I) of the present invention include (a) p-alkylphenols such as p-cresol, p-ethylphenol, p-isopropylphenol, p-tert-butylphenyl, p-sec-butylphenol, p-tert-amylphenol, p-hexylphenol, p-ter-octylphenol, p-nonylphenol, and p-dodecylphenol; (b) p-aralkylphenols such as p-benzylphenol, p-α-methylbenzylphenol, and p-α,α-dimethylbenzylphenol; and (c) p-arylphenols represented by p-phenylphenol. These p-substituted phenols may be singly or in mixtures of one or more phenols. P-phenylphenol is particularly preferrable from the viewpoint of the performance in terms of developing.

Examples of 2,4-di-substituted phenols expressed by Formula (II) of the present invention include (a) 2,4-dialkylphenols such as 2,4-xylenol, 2,4-diethylphenol, 2,4-diisopropylphenol, 2,4-di-tert-butylphenol, 2,4-di-tert-amylphenol, and 2,4-di-tert-octylphenol; (b) 2,4-diarylphenols such as 2,4-diphenylphenol; and (c) 2,4-diaralkylphenols such as 2,4-dibenzylphenol, 2,4-di-α-methylbenzylphenol, and 2,4-di-α,α-dimethylbenzylphenol.

Examples of 2,6-di-substituted phenols expressed by Formula (III) of the present invention include (a) dialkylphenols such as 2,6-xylenol, 2,6-diethylphenol, 2,6-diisopropylphenol, 2,6-di-tert-butylphenol, 2,6-di-tert-amylphenol, and 2-tert-butyl-6-methylphenol; (b) alkylarylphenols such as 2-methyl-6-phenylphenol; and (c) diaralkylphenols such as 2,6-dibenzylphenol and 2,6-di-α-methylbenzylphenol. These 2,4-di-substituted phenols and 2,6-di-substituted phenols may be used slightly or in mixtures of one or more phenols.

The ratio of a 2,4-di-substituted phenol and/or 2,6-di-substituted phenol used in combination with a p-substituted phenol (particularly p-phenylphenol) in the present invention is 22 to 150 parts by weight, preferably 22 to 80 parts by weight, relative to 100 parts by weight of the p-substituted phenol. With a ratio below 22 parts by weight, the effect of preventing yellowing in a developed layer is lost, while with a ratio above 150 parts by weight, the developing performance of deteriorates.

Examples of sources of formaldehyde for use in the condensation reaction of the present invention include an aqueous solution of formaldehyde, paraformaldehyde, and other compounds which easily produce formaldehyde. The usage of formaldehyde is 0.5 to 1.0 mole, preferably 0.6 to 0.8 mole, per mole of the total phenols of the p-substituted phenol, 2,4-di-substituted phenol and/or 2,6-di-substituted phenol employed.

Typical examples of methods for performing the condensation reaction in the present invention include (1) a method in which a mixture of a p-substituted phenol and a 2,4-di-substituted phenol and/or 2,6-di-substituted phenol is reacted with formaldehyde in the presence of an acid catalyst; and (2) one in which a p-substituted phenol and formaldehyde are firstly subjected to primary condensation reaction in the presence of an acid catalyst, and a 2,4-di-substituted phenol and/or 2,6-di-substituted phenol and formaldehyde, and, if required, an additional acid catalyst are then added to the reaction product so that the obtained mixture is subjected to secondary condensation reaction. This condensation reaction is preferably performed in water or an organic solvent, for example, in an aromatic hydrocarbon such as benzene or toluene.

Examples of acid catalysts which may be used in the condensation reaction of the present invention include generally used acid catalysts such as hydrochloric acid, phosphoric acid, oxalic acid and paratoluenesulfonic acid. The amount of catalyst used is about 0.1 to 10 wt% relative to the total amount of the phenols.

The temperature of condensation reaction of the present invention is 50° to 200° C., preferably 60° to 120° C., and the condensation reaction is generally performed at the reflux temperature of a reaction solvent, while the water formed as a by-product is being removed.

It is estimated that the phenolic resin obtained by the above-described condensation reaction is a mixture of various polymers having the structural formulae (a) to (h) described below (wherein $R^1$ denotes the same as that of $R^1$ in Formula (I); $R^2$ and $R^3$ each denote the same as that of $R^2$ and $R^3$ in Formula (II); $R^4$ and $R^5$ each denote the same as that of $R^4$ and $R^5$ in Formula (III); k, m and l each denote 0 or an integer from 1 to 7; and n denotes 0 or 1).

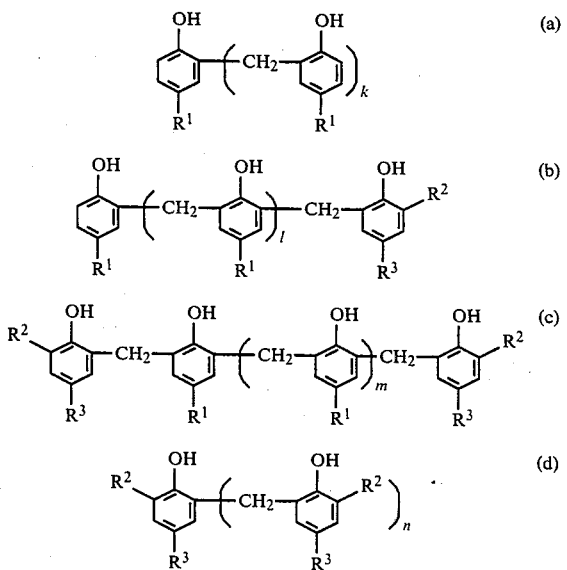

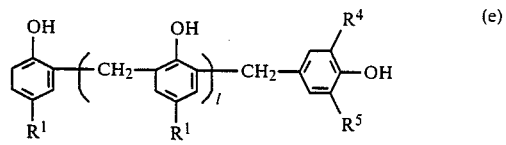

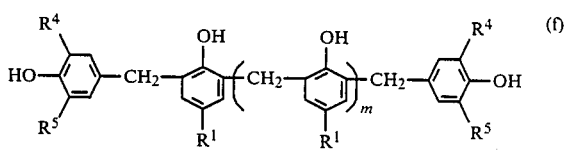

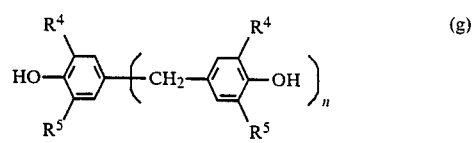

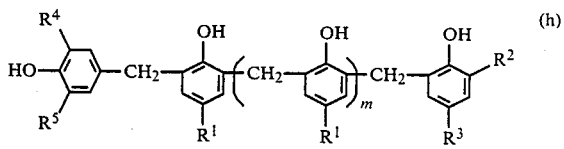

Phenols having substituents at the 2- or 2,6-position are generally known as hindered phenolic compounds and used as antioxidants. Such hindered phenolic compounds themselves produce yellowing of reduced degrees, but exhibit an extremely poor performance in terms of developing and thus cannot be used as developers for pressure-sensitive copy papers. While the phenolic resin obtained by the condensation reaction in the present invention displays an excellent developing performance and has the capability to greatly reduce yellowing, this is a remarkable fact.

Although the reason for this fact is not understood with certainty, in view of the fact that yellowing is caused by quinonization of phenolic hydroxyl groups, the reason is thought to be that the phenolic resin which serves as component (A) of the present invention, which comprises the co-condensation polymers formed by a p-substituted phenol and a 2,4-di-substituted or 2,6-di-substituted phenol, is prevented from being quinonized without the activity of the phenolic hydroxyl groups being reduced. In other words, it is thought that, since the phenolic resin which serves as component (A) contains a polymer having the structure (a) which has an excellent developing performance, polymers having the structures (d) and (g) which display excellent yellowing resistance, and copolymers having the structures (b), (c), (e), (f) and (h) which exhibit excellent performance in terms of developing and yellowing resistance, the phenolic resin exhibits an excellent overall performance in terms of developing and yellowing resistance.

Preferable examples of the zinc oxide that may be optionally used as another component in the developer composition of the present invention according to need include zinc oxide produced from a zinc metal (zinc oxide formed by the French method or an indirect method), zinc oxide directly produced from a zinc ore (zinc oxide formed by the American method or a direct method), and zinc oxide produced from a solution of an zinc salt by a wet method (active zinc oxide). Of these oxides, active zinc oxide having a large specific surface area is preferable.

The compounding ratio of zinc oxide to a phenolic resin is 10 to 200 parts by weight, preferably 20 to 150 parts by weight, relative to 100 parts by weight of the phenolic resin. With a ratio of zinc oxide below 10 parts by weight, the light resistance and discoloration problems relating to colored images are not satisfactorily solved, and with a radio of over 200 parts by weight, yellowing problems increase due to oxidizing gases.

A developer composition for a pressure-sensitive copy paper of the present invention exemplified by an aqueous developer composition used for producing a developing paper for a pressure-sensitive copying paper (lower sheet) is produced from the phenolic resin obtained by the above-described condensation reaction utilizing the method described below. After the solvent has been removed from the phenolic resin obtained by the condensation reaction, the phenolic resin is firstly treated in the presence of a dispersant by a sand grinding mill, a ball mill, or an analyzer to form an aqueous emulsion. If required, an inorganic pigment, a pigment dispersant, a binder and other additives are mixed with the aqueous emulsion of the phenolic resin to form an aqueous developer composition (coating). The aqueous coating is applied to a support such as a sheet of paper and then dried to form a developing paper (lower sheet) for a pressure-sensitive copying paper. In this case, examples of inorganic pigments include bentonite, silica, kaolin, talc, and calcium carbonate. Examples of pigment dispersants include polycarboxylates and phosphates. Examples of binders include water-soluble binders such as styrene-butadiene latexes (SBR), oxidized starch and polyvinyl alcohol.

The developer composition of the present invention can be prepared by using only the phenolic resin of the present invention as a developer component, but the developer composition may be used in combination with other known developers, for example, inorganic solid acids such as active china clay or metallic salts of substituted salicylic acid.

The use of the developer composition of the present invention can, without deteriorating the coloring performance, effectively prevent the yellowing which is produced when a copy paper is preserved and which is the greatest disadvantage experienced when conventional phenolic resin developers are used.

(Test Method)

The methods of testing and evaluating used in the examples and comparative examples of the present invention are given below.

(1) Test of coloring performance

An upper sheet (blue) of a pressure-sensitive copying paper available on the market (trade name: NCR N-40, produced by Mitsubishi Paper Mills, Ltd.) was superposed on a specimen of a developing sheet, and coloring was performed by using an application device of an iron roller type. Reflectance was then measured by using a photovolt type of reflectometer (using an amber filter). The coloring performance was evaluated on the basis of the calculation of the rate of coloring using the equation described below using reflectance $I_0$ measured before coloring and reflectance $I_1$ measured 15 second after coloring (the smaller the value of the rate of coloring, the better the coloring performance).

Rate of coloring $= I_1/I_0 \times 100$ (%)

(2) Yellowing Test

Four specimens of a developing sheet were placed one on top of another in a pile, and the Hunter whiteness thereof was measured by using a photoelectric colorimeter to obtain initial whiteness $K_0$. The specimens were then allowed to stand for 10 minutes in a vessel filled with 2000 ppm of $NO_x$ gases, and the Hunter whiteness was then measured in the same way as that described above to obtain whiteness K after yellowing. Evaluation was conducted on the basis of the calculation of the rate of residual whiteness using the equation given below (the larger the value of the rate of redisual whiteness, the lower the degree of yellowing).

Rate of residual whiteness $= K/K_0 \times 100$ (%)

(3) Test of Sun Discoloration

An upper sheet of a pressure-sensitive copying paper (trade name: NCR N-40, produced by Mitsubishi Paper Mills, Ltd.) was superposed on a specimen of a developing sheet, and coloring was performed by using an application device of an iron roller type. After the sheets had been allowed to stand for 48 hours, they were mounted on a frame at an angle of 45° and then exposed to the sun for 2 hours. The degrees of reflection $I_2$ and $I_3$ were respectively measured before and after the exposure by using a photovolt type of reflectometer, and evaluation was conducted on the basis of the calcuation of the rate of residue using the equation given below (the larger the value of the rate of residue, the lower the degree of sun discoloration).

Rate of residual color $= (I_0-I_3)/(I_0-I_2) \times 100$ (%)

(Examples)

A detailed description is given below with reference to examples and comparative examples. The terms "parts" and "%" used in these examples mean "parts by weight" and "% by weight", respectively.

EXAMPLE 1

170 g of p-phenylphenol, 61.8 g of 2,4-di-tert-butylphenol, 29.7 g of 92% paraformaldehyde, 2.3 g of p-toluenesulfonic acid, and 390 g of benzene were put in a glass flask. The mixture was then subjected to reaction at a reaction temperature of 70° to 82° C. for 5 hours under agitation, with the water in the reaction system being distilled off as an azeotrope with part of the benzene out of the flask and part of the benezene being returned to the flask by reflux. After the reaction has been completed, the remaining benzene was distilled off to obtain 235 g of a yellow phenolic resin.

The obtained phenolic resin was trimethylsilylated, and then the portion thereof which was within a low molecular weight range was measured by gas chromatography. The obtained result is shown in FIG. 1.

Thereafter 4 parts of sodium polyacrylate and 146 parts of water were added to 100 parts of the phenolic resin, and the obtained mixture was ground in a ball mill for 48 hours to obtain a 40% aqueous emulsion. The coating material having the composition described below was prepared by using the obtained emulsion, and was then applied onto a wood-free paper having a basis weight of 40 g/m² by using a bar coater so that the weight of the dried coating material was 4 g/m². The coated paper was then dried for 1 minute to obtain a developing paper (lower sheet).

| Coating composition | |
|---|---|
| Aqueous emulsion of phenolic resin (40%) | 7 g |
| Kaolin having an average particle size of 2μ | 12 g |
| Calcium carbonate having an average particle size of 1.5μ | 3 g |
| SBR latex (solid content: 50%) | 3 g |
| Oxidized starch (solid content: 10%) | 30 g |
| Water | 28 g |

The performance in terms of coloring and yellowing of the obtained developing paper was tested and evaluated by the methods described above. The results are given in Table 1.

EXAMPLE 2

170 g of p-phenylphenol, 206 g of 2,4-di-tert-butylphenol, 39.1 g of 92% paraformaldehyde, 3.7 g of p-toluenesulfonic acid and 560 g of benzene were put in a glass flask, and subjected to reaction in the same way as that of Example 1. The benzene was distilled off to obtain 380 g of yellow phenolic resin.

A developing paper was produced by using the obtained phenolic resin in the same way as that of Example 1, and the performance with respect to coloring and yellowing were tested by the same way. The obtained results are shown in Table 1.

EXAMPLE 3

170 g of p-phenylphenol, 42.5 g of 2,4-di-tert-butylphenol, 27.5 g of 92% paraformaldehyde 2.1 g of p-toluenesulfonic acid and 320 g of benzene were used in the reaction which was effected in the same way as that employed in Example 1. The benzene was distilled off to obtain 215 g of a yellow phenolic resin.

A developing paper was produced by using the thus-obtained phenolic resin in the same way as that employed in Example 1, and the performance in terms of coloring and yellowing were tested in the same way as those employed in Example 1. The results are shown in Table 1.

EXAMPLE 4

170 of p-phenylphenol, 117 g of 2,4-di-tert-amylphenol, 31.8 g of 92% paraformaldehyde, 2.9 g of p-toluenesulfonic acid and 430 g of benzene were put in a glass flask, and subjected to reaction in the same way as that employed in Example 1. The benzene was distilled off to obtain 290 g of a yellow phenolic resin.

A developing paper was produced by using the thus-obtained phenolic resin in the same way as that employed in Example 1, and the performance in terms of coloring and yellowing were tested in the same way as those employed in Example 1. The results are shown in Table 1.

EXAMPLE 5

170 g of p-phenylphenol, 51.5 g of 2,6-di-tert-butylphenol, 26.5 g of 92% paraformaldehyde, 1.8 g of p-toluenesulfonic acid and 300 g of benzene were put in a glass flask, and subjected to reaction for 5 hours at a reaction temperature of 70° to 82° C. under agitation, with the water in the reaction system being distilled off as an azeotrope with part of the benzene out of the flask and part of the benzene being returned to the flask by reflux.

After the reaction has completed, the remaining benzene was distilled off to obtain 225 g of a yellow phenolic resin.

A developing paper was produced by using the thus-obtained phenolic resin in the same way as that employed in Example 1, and the perforamnce in terms of coloring and yellowing were tested in the same way as those employed in Example 1. The results are shown in Table 1.

EXAMPLE 6

170 g of p-phenylphenol, 164.8 g of 2,6-di-tert-butylphenol, 35.2 g of paraformaldehyde, 2.7 g of p-toluenesulfonic acid and 450 g of benzene were put in a glass flask, and subjected to reaction in the same way as that employed in Example 1. The benzene was distilled off to obtain 340 g of yellow phenolic resin.

A developing paper was produced by using the thus-obtained phenolic resin in the say way as that employed in Example 1, and the performance in terms of coloring and yellowing were tested in the same way as those employed in Example 1. The results are shown in Table 1.

EXAMPLE 7

170 g of p-phenylphenol, 82 g of 2-tert-butyl-6-methylphenol, 31.8 g of 92% paraformaldehyde, 2 g of p-toluenesulfonic acid and 340 g of benzene were used in the reaction which was performed in the same way as that employed in Example 1. The benzene was distilled off to obtain 260 g of 260 g of a yellow phenolic resin.

A developing paper was produced by using the thus-obtained phenolic resin in the same way as that employed in Example 1, and the performance in terms of coloring and yellowing were tested in the same way as those employed in Example 1. The results are shown in Table 1.

COMPARATIVE EXAMPLE 1

170 g of p-phenolphenol, 22.8 g of 92% paraformaldehyde, 1.7 g of p-toluenesulfonic acid and 290 g of benzene were used in the reaction which was performed in the same way as that employed in Example 1. The benzene was distilled off to obtain 170 g of yellow phenolic resin.

A developing paper was produced by using the thus-obtained phenolic resin in the same way as that employed in Example 1, and the performance in terms of coloring and yellowing were tested in the same way as those employed in Example 1. The results are shown in Table 1.

COMPARATIVE EXAMPLE 2

170 g of p-phenylphenol, 27.7 g 92% paraformaldehyde, 1.7 g of p-toluenesulfonic acid and 290 g of benzene were used in the reaction which was performed in the same way as that employed in Example 1. The benzene was distilled off to obtain 170 g of yellow phenolic resin.

A developing paper was produced by using the thus-obtained phenolic resin in the same way as that employed in Example 1, and the performance in terms of coloring and yellowing were tested in the same way as those employed in Example 1. The results are shown in Table 1

COMPARATIVE EXAMPLE 3

After reaction had been performed in the same way as that employed in Comparative Example 1, 61.8 g of 2,4-di-tert-butylphenol was added to the reaction product before the benzene was distilled off. The mixture was well agitated to form a uniform solution. The benzene was then distilled off to obtain 230 g of a yellow phenolic resin composition.

The thus-obtained resin composition generated a strong odor and had a low melting point, the thus could not be put into practical use as a developer. However, this resin composition was used for producing a developing paper in the same way as that employed in Example 1, and the performance in terms of coloring and yellowing were tested in the same way as those employed in Example 1. The results are shown in Table 1.

COMPARATIVE EXAMPLE 4

206 g of 2,4-di-tert-butylphenol, 16.3 g of 92% paraformaldehyde, 2.1 g of p-toluenesulfonic acid and 230 g of benzene were used in the reaction which was performed in the same way as that employed in Example 1. The benzene was distilled off to obtain 205 g of a yellow phenolic resin.

The thus-obtained phenolic resin was used for producing a developing paper in the same way as that employed in Example 1, and the performance in terms of coloring and yellowing were tested in the same way as those employed in Example 1. The results are shown in Table 1.

COMPARATIVE EXAMPLE 5

A mixed phenolic resin which was obtained by mixing the phenolic resin obtained in Comparative Example 1 and the phenolic resin obtained in Comparative Example 4 in a ratio of 1 : 1 by weight was used for producing a developing paper in the same way as that of Example 1, and the performance in terms of coloring and yellowing were tested in the same way as those employed in Example 1. The results are shown in Table 1.

COMPARATIVE EXAMPLE 6

170 g of p-phenylphenol, 20.4 g of 2,4-di-tert-butylphenol, 25.1 g of 92% paraformaldehyde, 1.9 g of p-toluenesulfonic acid and 200 g of benzene were used in the reaction which was performed in the same way as that employed in Example 1. The benzene was distilled off to obtain 190 g of a yellow phenolic resin.

The thus-obtained phenolic resin was used for producing a developing paper in the same way as that employed in Example 1, and the performance in terms of coloring and yellowing were tested in the same way as those employed in Example 1. The results are shown in Table 1.

COMPARATIVE EXAMPLE 7

170 g of p-phenylphenol, 21.2 g of 92% paraformaldehyde, 1.4 g of p-toluenesulfonic acid, and 230 g of benzene were used in the reaction which was performed in the same way as that employed in Example 1. The benzene was distilled off to obtain 170 g of a yellow phenolic resin.

The thus-obtained phenolic resin was used for producing a developing paper in the same way as that employed in Example 1, and the performance in terms of coloring and yellowing were tested in the same way as those employed in Example 1.

The results are shown in Table 1.

COMPARATIVE EXAMPLE 8

170 g of p-phenylphenol, 10.3 g of 2,6-di-tert-butylphenol, 22.3 g of 92% paraformaldehyde, 1.4 g of p-toluenesulfonic acid and 250 g of benzene were used in the reaction which was performed in the same way as that employed in Example 1. The benzene was then distilled off to obtain 180 g of a yellow phenolic resin.

The thus-obtained phenolic resin was used for producing a developing paper in the same way as that employed in Example 1, and the performance in terms of coloring and yellowing were tested in the same way as those employed in Example 1.

The results are shown in Table 1.

COMPARATIVE EXAMPLE 9

Reaction was effected in the same way as that employed in Comparative Example 1, and then 50 g of 2,6-di-tert-butyl-4-methylphenol was added to the reaction product before benzene was distilled off to form a uniform solution. Then, the benzene was distilled off to obtain 220 g of a yellow phenolic resin. The thus-obtained phenolic resin was used for producing a developing paper in the same way as that of Example 1, and the performance in terms of coloring and yellowing were tested in the same way as those employed in Example 1.

The results are shown in Table 1.

TABLE 1

| Example | Result of test of coloring performance (rate of coloring %) | Result of test of yellowing (rate of residual whiteness %) |
| --- | --- | --- |
| Example | | |
| 1 | 52.5 | 87.6 |
| 2 | 55.7 | 94.1 |
| 3 | 51.6 | 85.1 |
| 4 | 53.4 | 91.2 |
| 5 | 51.8 | 86.4 |
| 6 | 53.2 | 91.4 |
| 7 | 52.2 | 88.8 |
| Comparative Example | | |
| 1 | 51.0 | 79.2 |
| 2 | 61.5 | 82.8 |
| 3 | 60.4 | 85.4 |
| 4 | 97.3 | 98.2 |
| 5 | 69.8 | 90.2 |
| 6 | 50.6 | 82.0 |
| 7 | 50.3 | 78.3 |
| 8 | 51.7 | 80.5 |
| 9 | 56.2 | 82.3 |

As can be seen from Table 1, the p-phenylphenol-formaldehyde resins show remarkable degrees of yellowing (Comparative Examples 1 and 7). If the amount of formaldehyde is increased so as to increase the molecular weight of the produced polymer, yellowing is slightly improved, but the performance in terms of coloring greatly deteriorates (Comparative Example 2). On the other hand, the phenolic resin of each of Examples shows extremely reduced degrees of yellowing and good performances in terms of coloring. In addition, the resins simply formed by uniformly mixing the 2,4-disubstituted phenol with the phenolic resins produced by using p-phenylphenol each show the poor performance in terms of coloring and of preventing yellowing (Example 1 and Comparative Example 3). When a resin is formed by condensation using a p-substituted phenol with the 2,4-di-substituted phenol, if the amount of the 2,4-di-substituted phenol used is small, the performance in terms of preventing yellowing deteriorates (Comparative Example 6).

Even if an unreactive hindered phenol is simply added to a p-phenylphenol-formaldehyde resin, yellowing is slightly improved, and the performance in terms of coloring deteriorates (Comparative Example 9).

In order to examine the effect produced when zinc oxide is added to the phenolic resins of the present invention, the experiments described below were conducted.

SYNTHETIC EXAMPLE 1

170 g of p-pohenylphenol, 19.6 g of 92% paraformaldehyde, 1.7 g of p-toluenesulfonic acid, and 280 g of benzene were put in a glass flask, and reaction was then effected at a reaction temperature of 70° to 82° C. under agitation for 5 hours, with the water in the reaction system being distilled off as an azeotrope with part of the benzene out of the flask and part of the benzene being returned to the flask by reflux. After the reaction has been completed, the remaining benzene was distilled off to obtain 170 g of a yellow phenolic resin.

SYNTHETIC EXAMPLE 2

170 g of p-phenylphenol, 103 g of 2,4-di-tert-butylphenol, 29.3 g of 92% paraformaldehyde, 2.7 g of p-toluenesulfonic acid and 410 g of benzene were put in a glass flask, and reaction was effected in the same way as that employed in Synthetic Example 1. The benzene was distilled off to obtain 270 g of a yellow phenolic resin.

SYNTHETIC EXAMPLE 3

170 g of p-phenylphenol, 103 g of 2,6-di-tert-butylphenol, 29.3 g of 92% paraformaldehyde, 2.7 g of p-toluenesulfonic acid and 410 g of benzene were put in a glass flask, and reaction was effected in the same way as that employed in Synthetic Example 1. The benzene was distilled off to obtain 270 g of a yellow phenolic resin.

SYNTHETIC EXAMPLE 4

170 g of p-phenylphenol, 24.4 g of 2,4-xylenol, 23.5 g of 92% paraformaldehyde, 1.6 g of p-toluenesulfonic acid and 290 g of benzene were put in a glass flask, and reaction was effected in the same way as that employed in Synthetic Example 1. The benzene was distilled off to obtain 195 g of a yellow phenolic resin.

EXAMPLES 8 TO 13 AND COMPARATIVE EXAMPLES 10 AND 11

Developing papers were produced by using the phenolic resins obtained in Synthetic Examples 1 to 4 in the same way as that employed in Example 1, and the performance in terms of coloring, yellowing, and resistance to sun discoloration were tested in the same way as those employed in Example 1. The obtained results are shown in Table 2.

TABLE 2

| Composition of aqueous coating | Example 8 | Example 9 | Example 10 | Example 11 | Example 12 | Comparative Example 10 | Comparative Example 11 | Example 13 |
|---|---|---|---|---|---|---|---|---|
| Phenolic resin (40%) | (Synthetic Example 2) 6 | (Synthetic Example 2) 6 | (Synthetic Example 2) 6 | (Synthetic Example 2) 6 | (Synthetic Example 3) 6 | (Synthetic Example 1) 6 | (Synthetic Example 1) 6 | (Synthetic Example 4) 6 |
| Zinc oxide | (Active zinc oxide*1) 1.2 | (Active zinc oxide) 2.4 | (Active zinc oxide) 3.6 | (Special zinc oxide*2) 2.4 | (Active zinc oxide) 2.4 | 0 | (Active zinc oxide) 2.4 | (Active Zinc oxide) 2.4 |
| Kaolin | 10.8 | 9.6 | 8.4 | 9.6 | 9.6 | 12 | 9.6 | 9.6 |
| Calcium carbonate | 3 | 3 | 3 | 3 | 3 | 3 | 3 | 3 |
| SBR latex (50%) | 3 | 3 | 3 | 3 | 3 | 3 | 3 | 3 |
| Oxidized starch | 30 | 30 | 30 | 30 | 30 | 30 | 30 | 30 |
| Sodium polyacrylate (20%) | 0.2 | 0.2 | 0.2 | 0.2 | 0.2 | 0.2 | 0.2 | 0.2 |
| Water | 28 | 28 | 28 | 28 | 28 | 28 | 28 | 28 |
| Test of coloring performance (rate of coloring %) | 53.4 | 52.8 | 52.6 | 53.0 | 53.3 | 53.1 | 52.2 | 51.4 |
| Test of yellowing (rate of residual whiteness %) | 84.3 | 83.6 | 82.1 | 84.7 | 83.4 | 77.3 | 73.6 | 81.6 |
| Test of sun discoloration (rate of residual coloring %) | 79.6 | 82.8 | 84.2 | 82.2 | 83.8 | 76.5 | 84.6 | 84.0 |

*1 Active zinc oxide "ZINCA" (trade name) produced by Sakai Chemical Industry Co, Ltd.
*2 French method zinc oxide "SAZEX" (trade name) produced by Sakai Chemical Industry Co., Ltd.

As can be seen from Table 2, the addition of zinc oxide to each of the p-phenylphenol-formaldehyde resins improves the resistance to sun discoloration, but deteriorates yellowing caused by the oxidizing gases which is a disadvantage of p-phenylphenol-formaldehyde resins (Comparative Examples 10 and 11). On the other hand, it is recognized that the combination of the phenolic resins as developer components in the present invention with zinc oxide can produce developing papers which show reduced degrees of yellowing, improved resistance to sun discoloration, and excellent performances in terms of coloring.

The developing papers of the present invention are capable of improving yellowing produced when they are preserved and sun discoloration of colored images, without deteriorating the performance in terms of coloring.

What is claimed is:

1. A developing composition for a pressure-sensitive copy paper comprising a phenolic resin which is obtained by condensating with formaldehyde using 100 parts by weight of a p-substituted phenol expressed by the following formula:

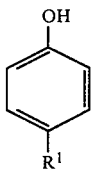

(wherein $R^1$ denotes an alkyl group having 1 to 12 carbon atoms, an aryl group having 6 to 12 carbon atoms, or an aralkyl group having 7 to 12 carbon atoms) with 22 to 150 parts by weight of a 2,4-di-substituted phenol expressed by the following formula:

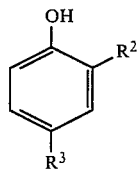

(wherein $R^2$ and $R^3$ each denote an alkyl group having 1 to 12 carbon atoms, an aryl group having 6 to 12 carbon atoms, or an aralkyl group having 7 to 12 carbon atoms, and which may be the same or different from each other) and/or 2,6-di-substituted phenol expressed by the following formula:

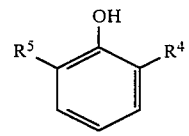

(wherein $R^4$ and $R^5$ each denotes an alkyl group having 1 to 12 carbon atoms, an aryl group having 6 to 12 carbon atoms, or an aralkyl group having 7 to 12 carbon atoms, and which may be the same or different from each other).

2. A developing composition according to claim 1, wherein said p-substituted phenol is p-phenylphenol.

3. A developing composition according to claim 1, wherein said phenolic resin is obtained by condensating p-substituted phenol and 2,4-di-substituted phenol with formaldehyde.

4. A developing composition according to claim 1, wherein said phenolic resin is obtained by condensating p-substituted phenol and 2,6-di-substituted phenol with formaldehyde.

5. A developing composition according to claim 1, wherein said phenolic resin is obtained by condensating p-substituted phenol, 2,4-di-substituted phenol and 2,6-di-substituted phenol with formaldehyde.

6. A developing composition according to any one of claims 1 to 5 characterized by being obtained by mixing 10 to 200 parts by weight of zinc oxide with 100 parts by weight of said phenolic resin.

7. A developing composition according to claim 1, wherein said condensation is performed in the presence of an acid catalyst.

* * * * *